(No Model.) 2 Sheets—Sheet 1.
P. LANGHAMMER.
ROTARY BRAKE.
No. 398,058. Patented Feb. 19, 1889.
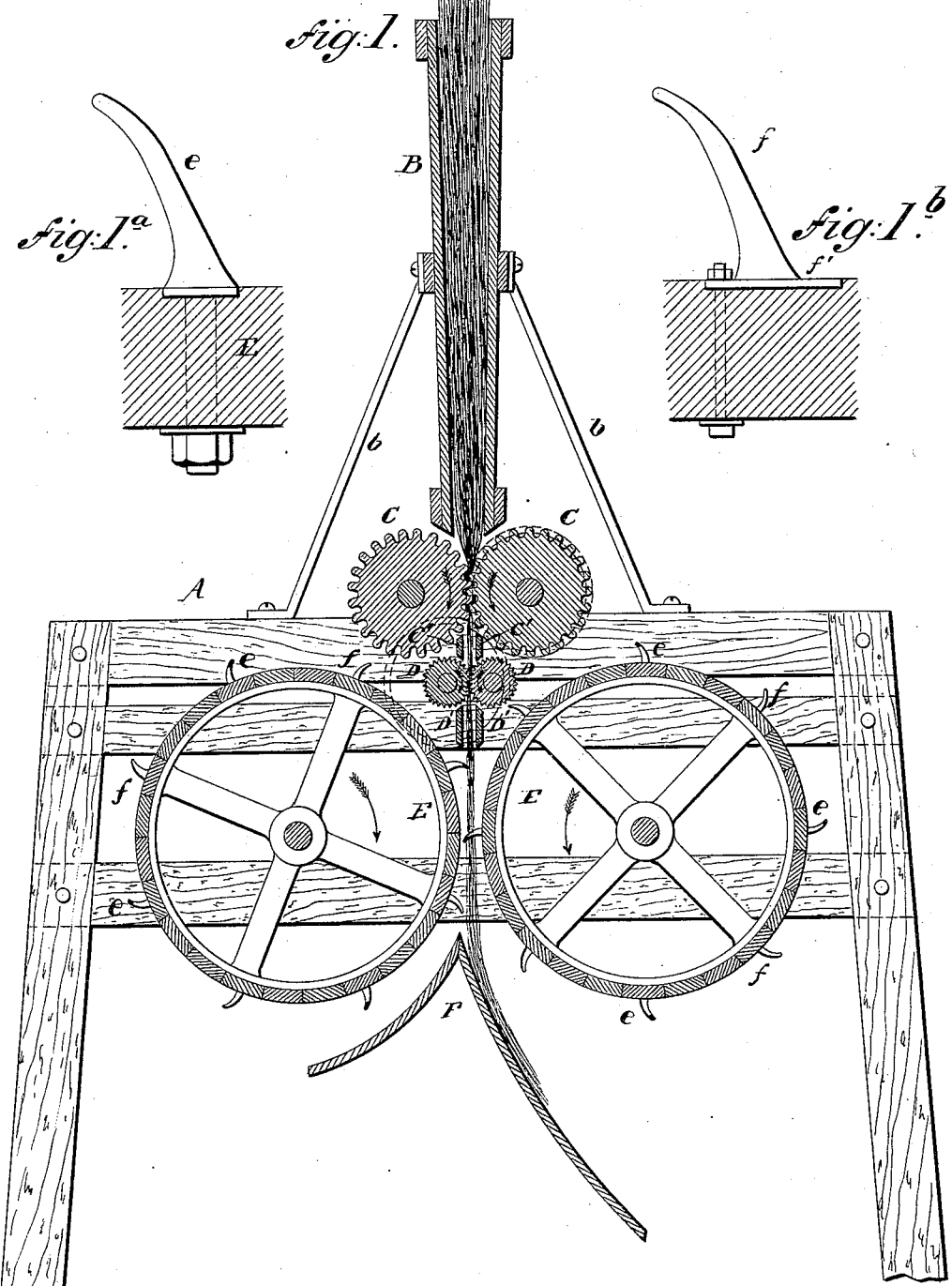
WITNESSES:
A. Schehl.
Carl Kurz
INVENTOR,
Paul Langhammer
BY
Foerner Raegener
ATTORNEYS (No Model.) 2 Sheets—Sheet 2.
P. LANGHAMMER.
ROTARY BRAKE.
No. 398,058. Patented Feb. 19, 1889.
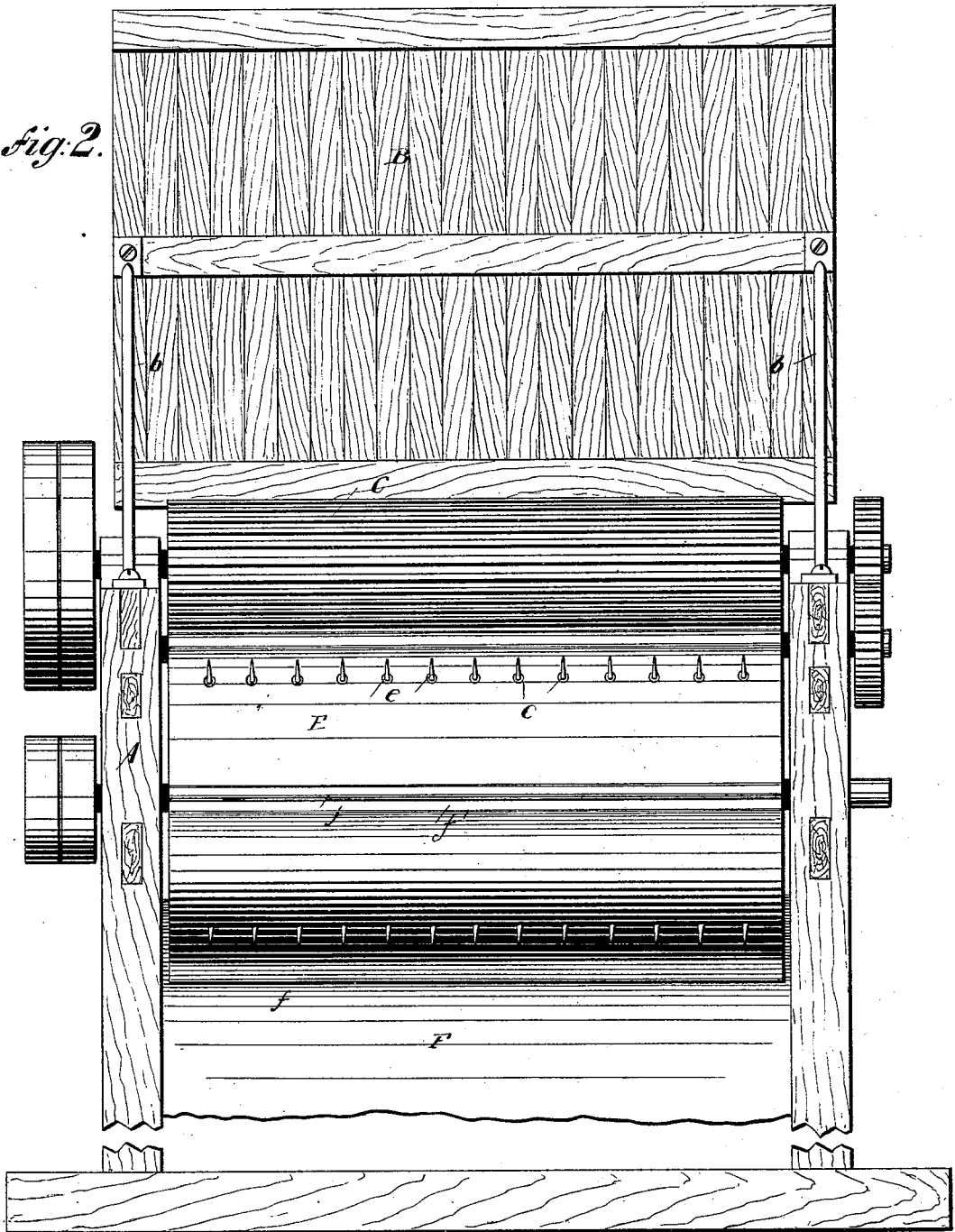

UNITED STATES PATENT OFFICE.

PAUL LANGHAMMER, OF NEW ORLEANS, LOUISIANA.

ROTARY BRAKE.

SPECIFICATION forming part of Letters Patent No. 398,058, dated February 19, 1889.

Application filed February 10, 1888. Serial No. 263,605. (No model.)

*To all whom it may concern:*

Be it known that I, PAUL LANGHAMMER, of New Orleans, in the parish of Orleans and State of Louisiana, have invented certain new and useful Improvements in Rotary Brakes, of which the following is a specification.

This invention relates to an improved machine for extracting fibers from jute, ramie, and other plants containing fibers, said fibers to be worked up into textile and other fabrics, ropes, &c.; and the invention consists in a hopper for feeding the stalks to crushing-rolls, a pair of holding-rolls, rotary cylinders or drums provided with alternating rows of cutting-teeth and scrapers, guides interposed between the crushing and holding rolls, and the holding-rolls and the cylinders. Below the cylinder are located inclined plates, over which the fibers produced from the stalks by the action of the rolls and cylinders are conducted off.

In the accompanying drawings, Figure 1 represents a vertical transverse section of my improved machine for extracting fibers. Figs. 1$^a$ and 1$^b$ are details showing, respectively, the manner of mounting the teeth in the cylinder and the scraper-bars applied to the same; and Fig. 2 is a broken side elevation of the machine.

Similar letters of reference indicate corresponding parts.

Referring to the drawings, A represents the supporting-frame of my improved machine for extracting fibers from jute, ramie, and other leaves or stalks. At the upper part of the supporting-frame A is arranged a narrow tapering box or hopper, B, which is supported in position by strong iron bars $b$ $b$, that extend from the supporting-frame to the exterior re-enforcing stays of the hopper B.

Close to the lower end of the hopper B is arranged a pair of crushing-rolls, C, which are preferably fluted for the purpose of breaking up the stalks or leaves passed through between the same. The axles of the crushing-rolls are supported in suitable bearings on the supporting-frame A and rotated by suitable transmitting gear-wheels. Below the crushing-rolls C C is arranged a pair of smaller guide-rolls, D, which may be smooth or fluted, said rolls serving to guide the crushed stalks and hold them while being acted upon by the teeth and scrapers of a pair of cylinders or drums, E, which are supported in suitable bearings on the frame A, below the holding-rollers D D. Between the crushing and 1 olding rolls and between the latter and the cylinders E are interposed guide-boxes C' and D', as shown in Fig. 1, which serve for the purpose of conducting the crushed stalks to the cylinders and prevent the scattering of the same. The crushing and holding rolls C and D are rotated at the same speed, while the speed of the cylinders E E has to be much faster than that of the crushing and holding rolls, according to the nature of the fibers, leaves, and plants to be decorticated. Below the cylinders E E is arranged an angular downwardly-inclined conducting-plate, F, the apex of which is preferably located at one side of the vertical axis of the machine, as shown in Fig. 1, so as to convey the fibers along the said plate F. The cylinders E are alternately provided at suitable distances from each other with series of rows of teeth, $e$, which are provided with rounded-off points and with transverse scraper bars or blades $f$, that are rounded off at their outer edges. The teeth $e$ are secured by threaded shanks and screw-nuts to the cylinders E, while the scraper-bars $f$ are applied to base-plates $f'$, bolted to the cylinders, as shown clearly in Figs. 1$^a$ and 1$^b$. The cylinders E may be constructed of wood, iron, or other suitable material and of any suitable width, the width of the crushing and holding rolls, supply-hopper, and guide-boxes corresponding thereto. The decorticating-teeth and scraper-bars may be arranged near together at varying distances from each other, according to the plants or leaves to be treated. They may be attached to the cylinder in regular series, or irregular, as desired. The disposition of the working parts of the machine may be either vertical, as shown in the drawings, or horizontal—one in front of the other—as desired.

The operation of the machine is as follows: The jute or ramie stalks or leaves are fed into the feed box or hopper and then acted upon by crushing-rolls C, by which they are crushed and from which they are fed through the first guide-box to the holding-rolls D, and from the same through the second guide-box to the cylinders E, being held by the second set of rolls, D, so as to be thoroughly scraped and worked upon by the scraping-cylinders, which have at least four times quicker speed than the feeding and holding rolls, so that the teeth and scrapers of the cylinders act readily and often enough on the crushed stalks for the teeth e to split and separate the fibers lengthwise and the bars or blades f to scrape off the woody or fleshy parts, thereby separating and cleaning the fibers and transferring the same to the inclined plate or platform F, below the cylinders, from which plate they are taken off for final treatment.

Having thus described my invention, I claim as new and desire to secure by Letters Patent—

1. In a machine for extracting fibers, the combination of a pair of rotary crushing-rolls, a pair of rotary holding-rolls, a pair of rapidly-revolving cylinders provided with rows of teeth having rounded-off points and alternating scraper bars or blades having rounded-off edges, and guide-boxes located between the crushing and holding rolls and between the latter and the scraping-cylinders, substantially as set forth.

2. In a machine for extracting fibers, the combination of a tapering feed box or hopper, a pair of rotary crushing-rolls, a pair of rotary holding-rolls, a pair of rotary cylinders having rows of teeth having rounded-off points and alternating scraper bars or blades having rounded-off edges, guide-boxes interposed between the feeding and holding rolls and between the latter and the cylinders, and an inclined conducting-plate for the fibers, substantially as set forth.

In testimony that I claim the foregoing as my invention I have signed my name in presence of two subscribing witnesses.

PAUL LANGHAMMER.

Witnesses:
H. BOETTNER,
P. SCHREIBER.